March 29, 1960   R. L. HOLLOWAY ET AL   2,930,616
BOWLING PIN RESPOTTING MECHANISM
Original Filed Aug. 18, 1950                        7 Sheets-Sheet 3
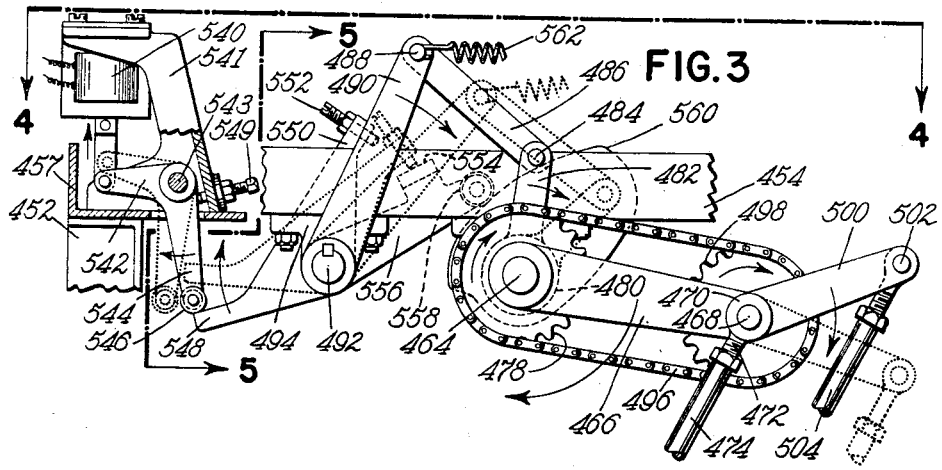
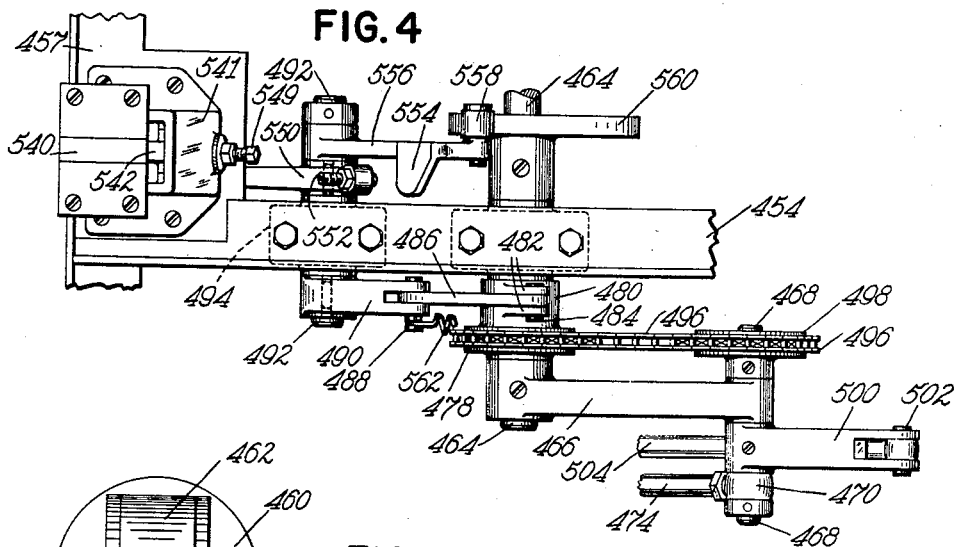
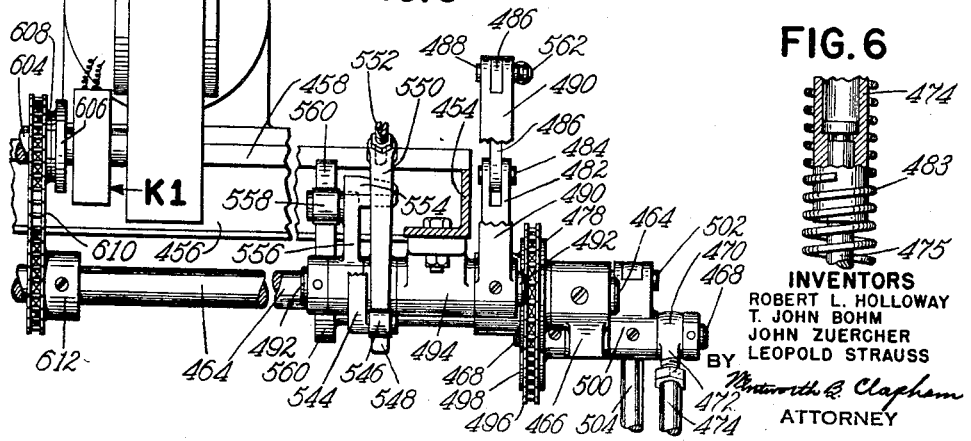
INVENTORS
ROBERT L. HOLLOWAY
T. JOHN BOHM
JOHN ZUERCHER
LEOPOLD STRAUSS
BY
ATTORNEY

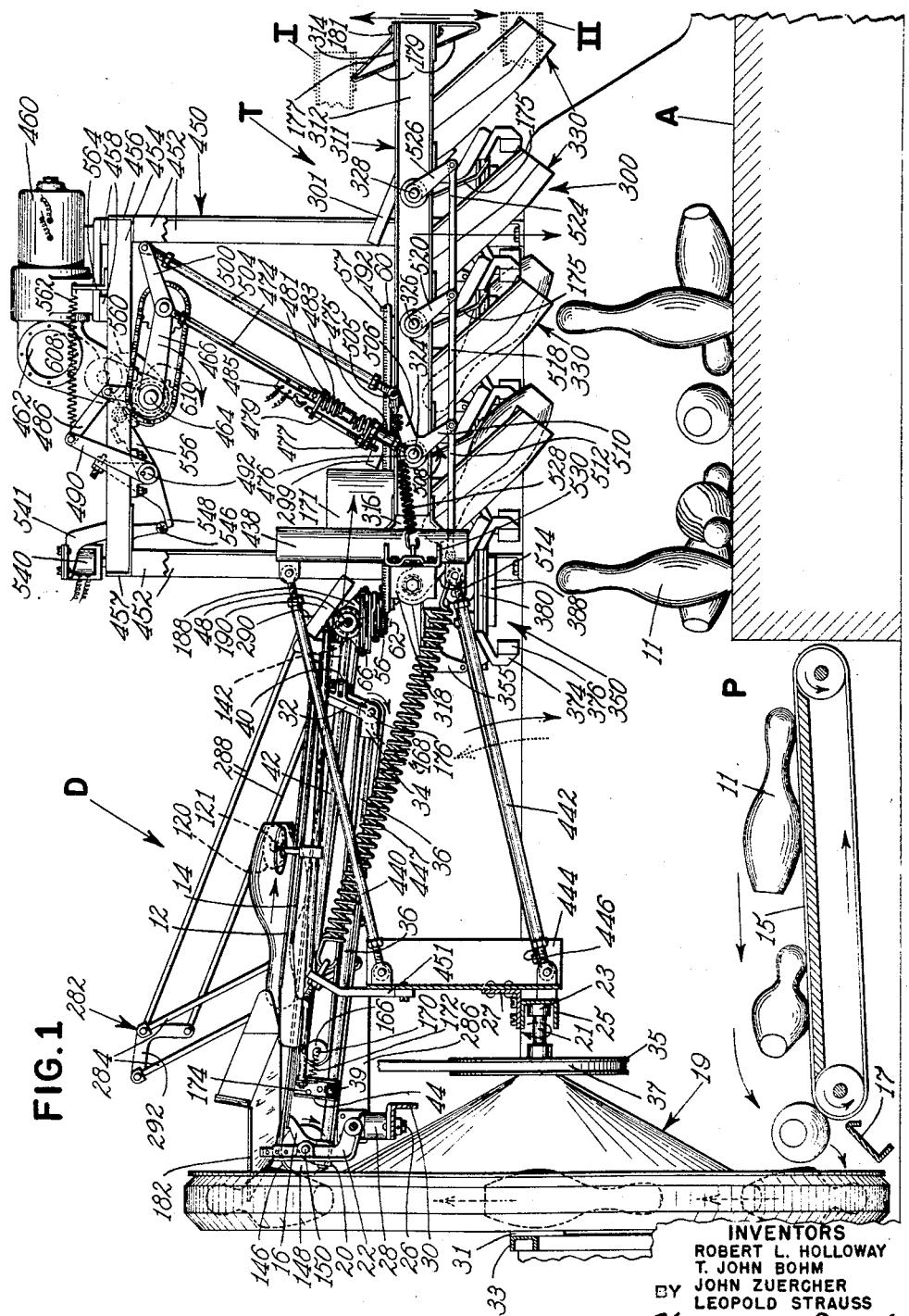

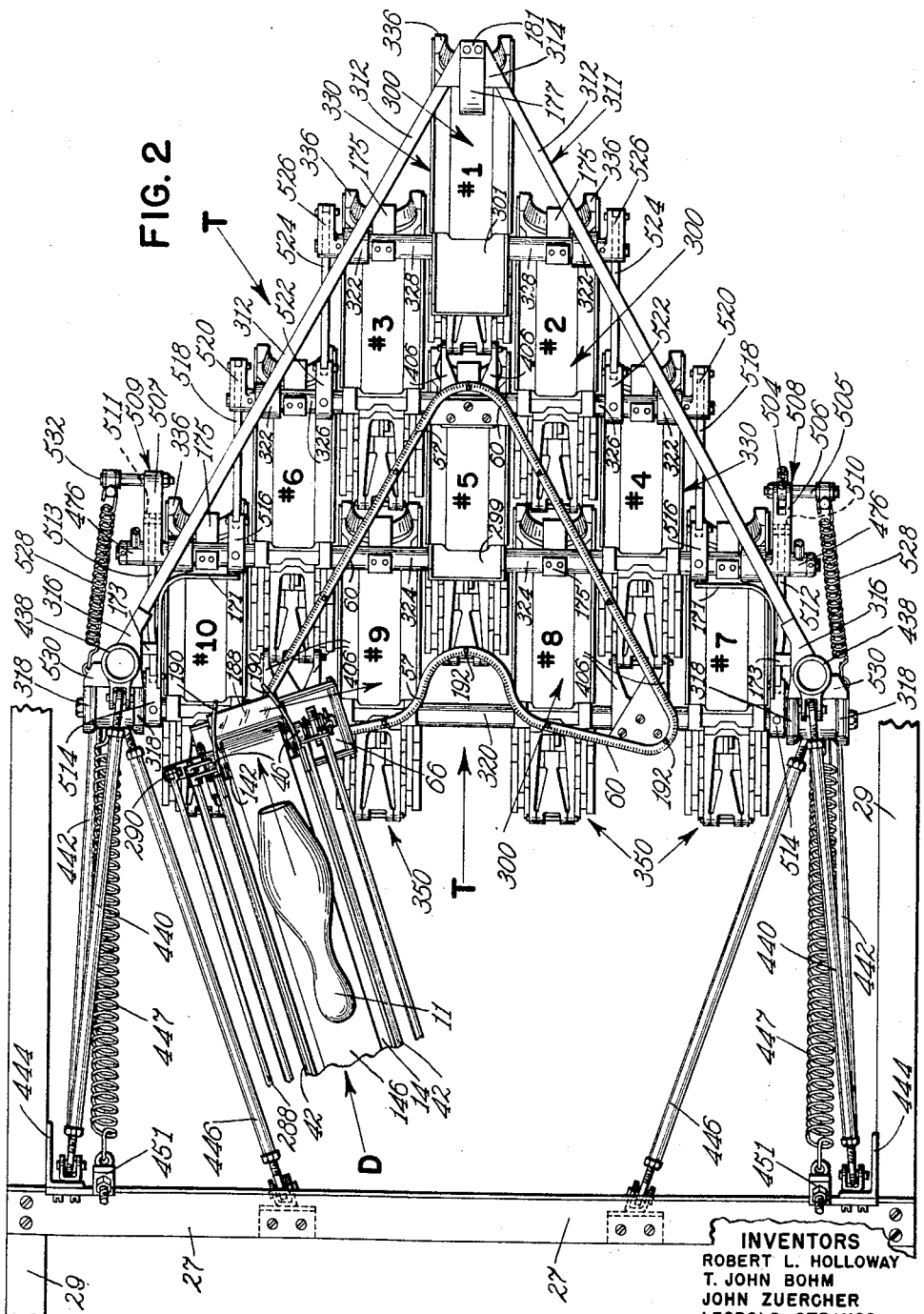

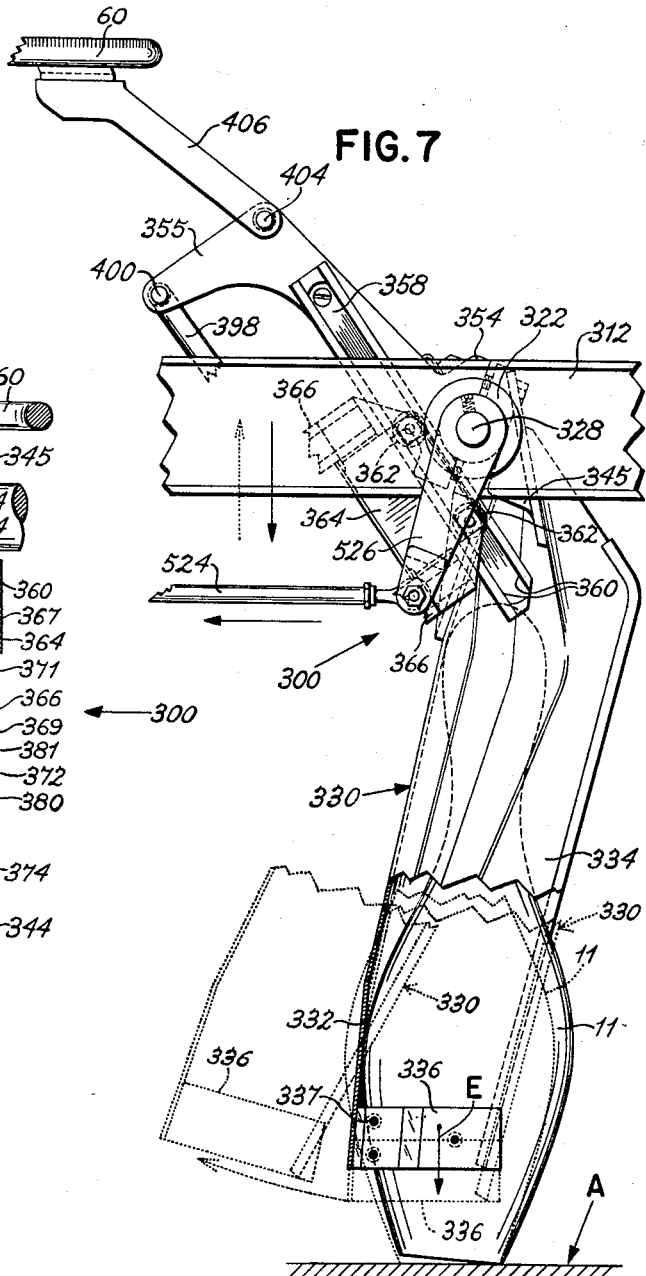
March 29, 1960 R. L. HOLLOWAY ET AL 2,930,616
BOWLING PIN RESPOTTING MECHANISM
Original Filed Aug. 18, 1950 7 Sheets-Sheet 4
INVENTORS
ROBERT L. HOLLOWAY
T. JOHN BOHM
JOHN ZUERCHER
BY LEOPOLD STRAUSS
ATTORNEY

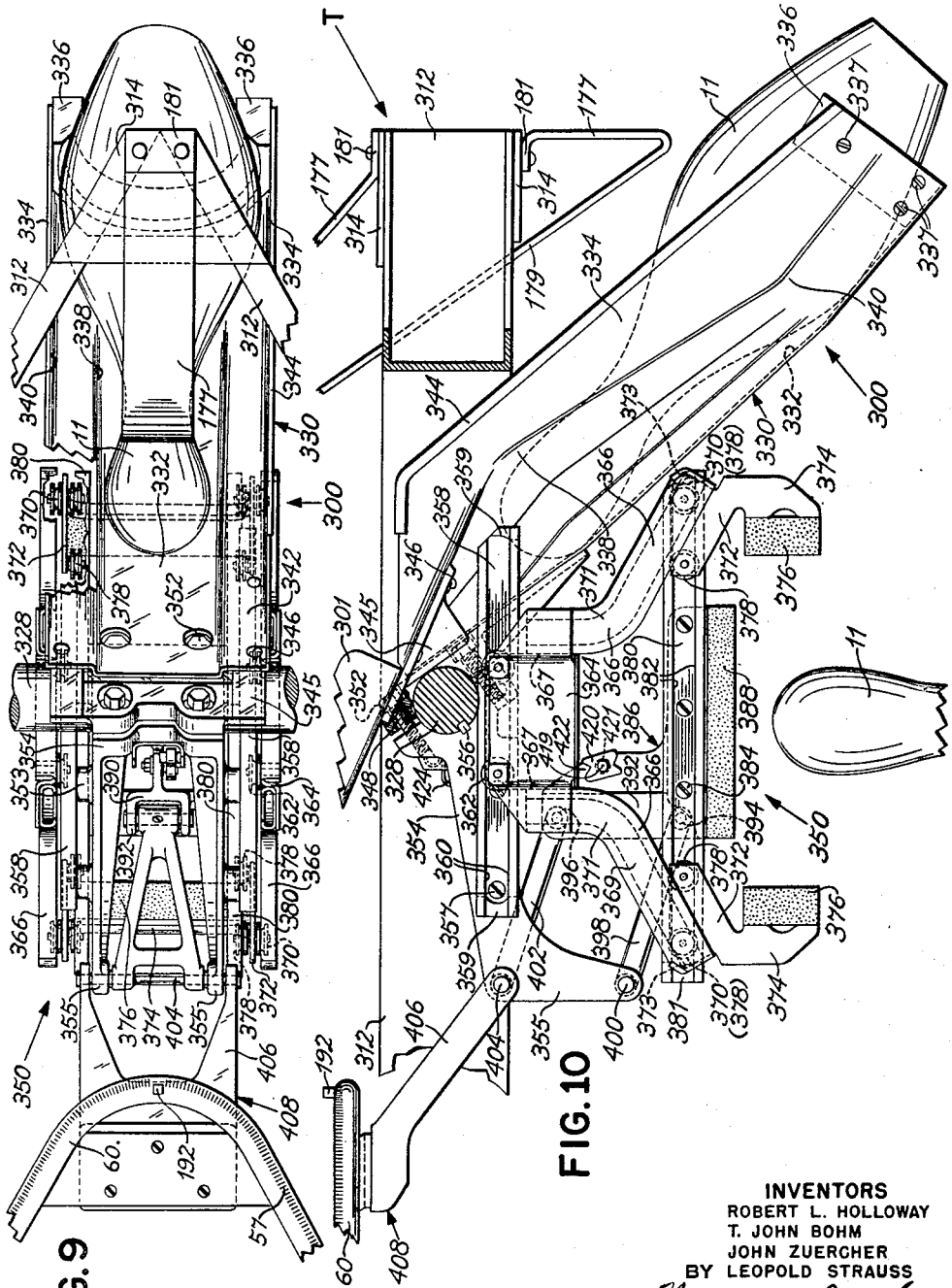

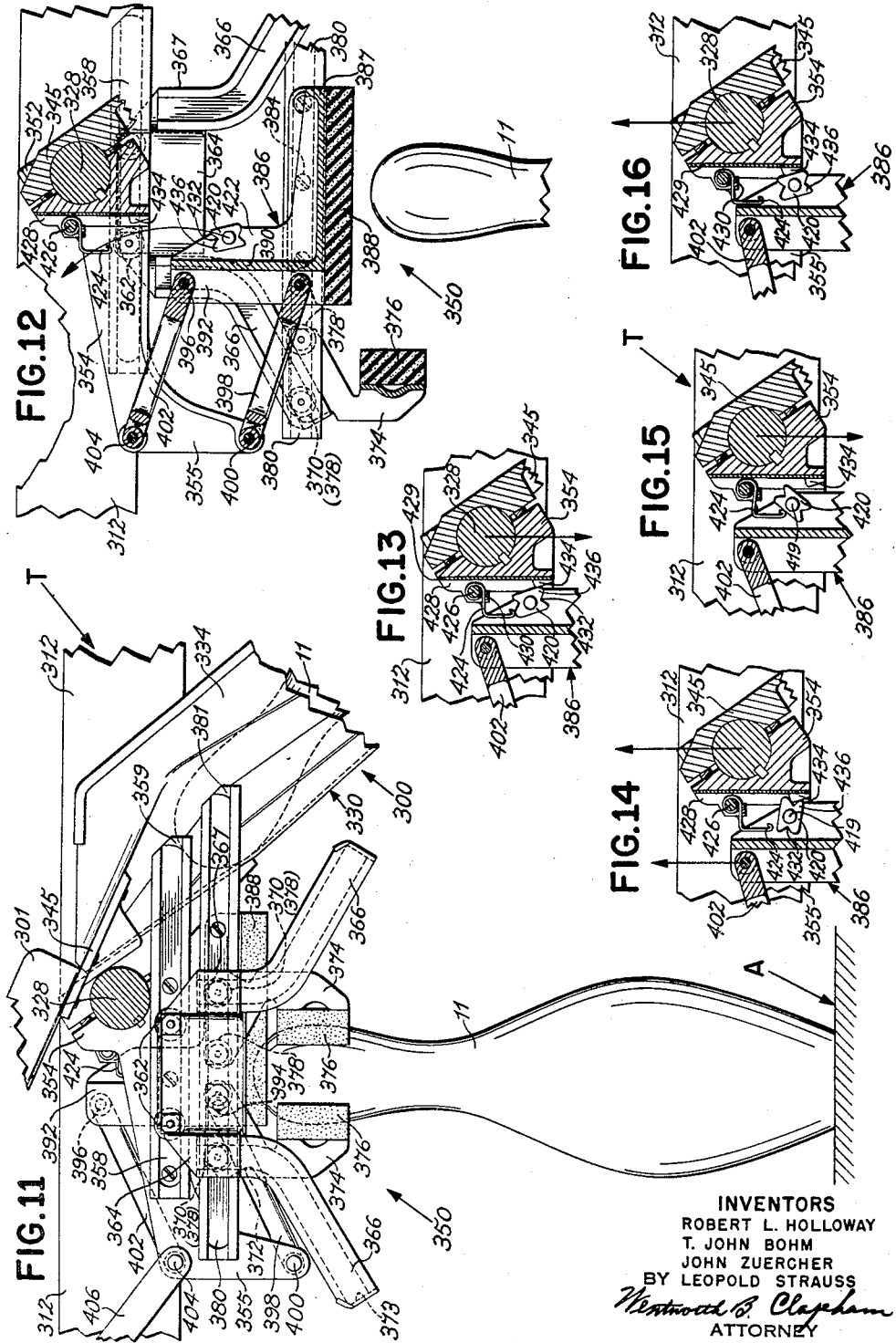

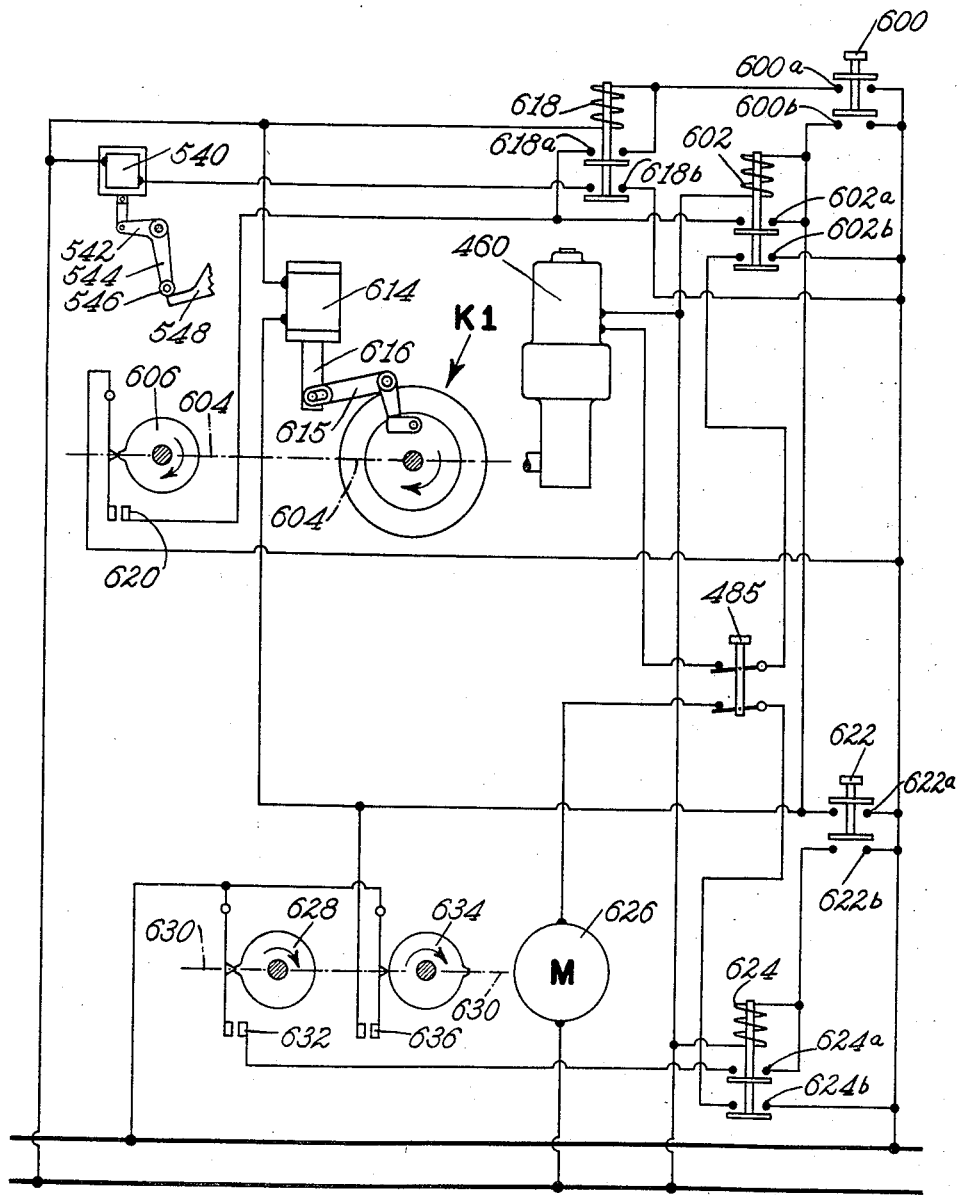

United States Patent Office 2,930,616
Patented Mar. 29, 1960

2,930,616

BOWLING PIN RESPOTTING MECHANISM

Robert L. Holloway, Snyder, and Toivo John Bohm, Clarence Center, N.Y., John Zuercher, Mansfield, Ohio, and Leopold Strauss, East Rockaway, N.Y., assignors to American Machine & Foundry Company, a corporation of New Jersey Original application August 18, 1950, Serial No. 180,174, now Patent No. 2,781,195, dated February 12, 1957. Divided and this application December 28, 1955, Serial No. 555,884

13 Claims. (Cl. 273—43)

This invention relates to bowling pin spotting machines, and more particularly to improvements in mechanisms for spotting and respotting bowling pins on the playing bed of a bowling alley, and means for rapidly effecting the delivery of bowling pins to the spotting mechanism without interrupting the movement of the latter relative to the bed of the bowling alley with which the machine is associated.

In bowling pin spotting machines, and especially in automatic bowling pin spotting machines, there are always present problems affecting the delivery of bowling pins from the pit of a bowling alley with which a pin spotting machine is associated, and distribution of the pins to a pin spotter operative to place pins in a predetermined playing arrangement upon the playing bed of a bowling alley. Many attempts have been made in the past to solve these problems, and means have been provided for automatically setting pins on the playing bed of a bowling alley. In such devices, complicated structure has been employed which resulted in an extremely heavy structure embodying pin spotting devices and pin respotting devices of such a nature that parts thereof are relatively inaccessible, and make repairs and adjustments both expensive and difficult.

The present invention is directed towards solving the above noted problems. The bowling pin spotting and respotting mecahnism, constructed in accordance with the invention, is both simple and easy to operate and involves the use of a minimum number of parts for accomplishing these important purposes. The present invention includes a table or elevator which is movable to and from the playing bed of a bowling alley and which is provided with separate pin spotting units, and pin respotting devices operative to place bowling pins in playing arrangement on the bed of a bowling alley, and after the rolling of the first ball of any frame, if pins remain standing, such pins, whether standing in on or off-spot position on the playing bed of the alley, are automatically gripped, lifted and returned to substantially the same position each occupied before being lifted.

This application is a division of application Serial No. 180,174, filed August 18, 1950, and now Patent No. 2,781,195.

An important feature of the respotting device is the provision of means which, due to the relative movement of the table with respect to standing pins, are operated upon engagement with such standing pins to effect the firm gripping of such pins whether on or off-spot for lifting and return to their exact playing positions on the bed of the alley.

The invention further takes into consideration the desirability of loading the several pin spotter units not only when the pin spotting and respotting table is held stationary, but also during at least a part of the travel of the table to and from the alley such that the several pin spotter units, usually ten in number, are filled with pins ready for spotting in the next frame in a minimum of time, thus greatly speeding up the play of the game. This results in a more efficient use of alleys with which machines, constructed in accordance with the invention, are associated, and also contributes to the satisfaction of each player because of the more rapid spotting and respotting of pins on the bowling alley than can be effected by a pin boy who spots and respots pins manually.

It is an object of the invention to provide an improved pin respotting mechanism which spots and respots pins accurately upon the bowling bed of a bowling alley.

It is a further object of the invention to provide improved respotting mechanism including a table which is moved to and from the playing bed of a bowling alley, which table is provided with pin spotting units, adapted to place a predetermined number of bowling pins, usually ten bowling pins, in a desired playing arrangement, such as the conventional triangular pin playing arrangement, and respotting units which respot any standing pins, after the rolling of the first ball of a frame in substantially the exact on or off-spot position each occupied prior to being lifted or respotted.

The invention also includes an improved bowling pin spotting machine having a bowling pin spotting and respotting table with which is associated a travelling distributor for automatically delivering pins one by one to spotting units carried by the table, which table at the proper time is moved into pin spotting relationship with reference to the playing bed of a bowling alley such that upon actuation of the spotting units, pins carried thereby are deposited in playing arrangement upon the playing bed of the alley.

The invention is also characterized by a novel bowling pin spotting and respotting table movable to and from the playing bed of a bowling alley, which table is furnished with a plurality of triangularly arranged movable spotting units adapted to place pins in playing arrangement upon the playing deck of a bowling alley and pin actuated respotting units operative in response to the movement of the table towards the bowling alley after the rolling of the first ball of a frame to operate the pin respotting units corresponding to standing pins for gripping such pins for lifting by the table as it moves upwardly away from the alley and which, in response to the replacement of such lifted bowling pins on the alley in their on or off-spot positions, are actuated to release such pins in order that when the table moves upwardly again, these pins remain in their respotted positions on the alley.

It is a further object of the invention to provide a spotting and respotting table which is moved to and from the playing bed of a bowling alley, and wherein the table is located at the same height above the bed both when spotting and respotting pins, thus making it possible to provide a simple harmonic drive for actuating the table.

With these and other objects not specifically mentioned in view, the invention consists in certain combinations and constructions which will be hereinafter fully described, and then set forth in the claims hereunto appended.

In the accompanying drawings which form a part of this specification, and in which like characters of reference indicate the same or like parts:

Figure 1 is a side elevation illustrating a preferred embodiment of the invention;

Figure 2 is a plan view of a part of the mechanism shown in Figure 1;

Figure 3 is a side elevation illustrating a preferred embodiment of the respotter control mechanism;

Figure 4 is a plan view taken on line 4—4 of Figure 3;

Figure 5 is an end elevation taken on line 5—5 of Figure 3;

Figure 6 is a view, partly in section, of a detail of one of the table operating connecting rods;

Figure 7 is a side elevation of one of the spotter units in pin spotting position relative to the playing bed of a bowling alley;

Figure 8 is an end elevation of a spotting unit;

Figure 9 is a plan view of a spotting unit and a respotting unit;

Figure 10 is a side elevation of the same;

Figure 11 is a side elevation of a respotting unit gripping a pin to be lifted for respotting;

Figures 12 to 16 inclusive illustrate successive steps in the locking unlocking of the grippers of a respotting unit; and Figure 17 illustrates a suitable wiring diagram for operating the spotting-respotting table.

In the mechanism shown in Figure 1, a device for lifting pins from the pit of a bowling alley can be of similar construction and operation to that disclosed in R. L. Holloway et al. Patent 2,767,283, for Bowling Pin Elevating Mechanism. Bowling pins lifted from the pit of a bowling alley are distributed by a distributing device of a type similar to that disclosed in Zuercher Patent 2,767,984 for Pin Distributing and Spotting Mechanism for Bowling Pin Spotting Machines. If desired, however, the bowling pin respotting mechanism, which forms a part of the present invention, may be used with other types of bowling pin spotting machines with which it is adaptable. Therefore, it is not to be considered that the bowling pin respotting mechanism of the present application is limited in use to the devices shown in the above referred to patents.

Referring to the drawings, Figure 1 illustrates a preferred embodiment of the invention. Pins 11 are spotted and respotted on the playing bed A of a bowling alley. Bowling pins 11 which are knocked down by a ball or by other pins, or which are removed from bed A by suitable means (not shown), fall into pit P upon the upper lap of conveyor 15, preferably continuously driven, which delivers them to a guide chute 17 extending transversely of the pit. Guide chute 17 directs the pins into a pin elevating mechanism, such as a rotary disc or drum designated generally 19.

The bowling pin elevating mechanism can be similar in construction and operation to that disclosed in R. L. Holloway et al. Patent 2,767,983. Disc 19 is mounted for rotation on a horizontal shaft 21 having one end journalled in a bearing 23 attached to a channel member 25 suitably secured to a cross frame member 27 extending transversely across the pit and bolted or otherwise suitably secured to the top of kickbacks 29. The other end of shaft 21 is journalled in a bearing 31 suitably secured to frame member 33. Disc 19 preferably is rotated continuously at a desired rate of speed by means of a pulley 35 secured thereto. Pulley 35 is driven by a belt 37 from a driving pulley (not shown) driven from a motor or other suitable source of power (not shown) at a desired rate of speed, in a manner similar to that described in R. L. Holloway et al. Patent 2,767,983.

Disc 19 is provided with a plurality of equally spaced pockets (not shown) into which pins are directed by chute 17, and wherein pins are retained by gripping rods (not shown) actuated by a cam (not shown) in such manner that each pin, seated and held in a pocket, is elevated from a position adjacent the delivery edge of chute 17 to a point substantially directly above, where it is released and falls free from its respective pocket into a pin receiving and orienting chute 182 of the distributing mechanism on the distributor, designated generally D. Bowling pins, discharged from pit P of the bowling alley in the manner described hereinabove and elevated by pin elevating mechanism 19, are delivered one by one by distributor D into pin spotting units or receptacles 300 carried by table T. The latter also is provided with respotting devices associated therewith and designated generally 350 adapted to respot bowling pins in on or off-spot playing arrangement on bed A of a bowling alley. Table T is mounted for movement to and from playing bed A of a bowling alley for spotting and respotting bowling pins thereon. Distributor D may be substantially the same in construction and operation as that shown and described in the above referred to Zuercher patent.

Referring to Figures 1 and 2, pin distributor D consists of a pair of U-shaped pin guide chutes 12 and 14, slideably arranged in a telescopic manner in order to provide a guide chute which can be automatically extended or retracted in order to deliver bowling pins one by one to the several pockets 300 of table T. Guide chute 12 at one end is secured to a pair of spaced brackets 16, one of which is shown in Figure 1. Each bracket 16 is provided with an extending hub rotatably supported in a bearing of frame bracket 22. Frame bracket 22 is provided with a stud 26 which engages with a vertical bearing bracket 28, the upper face of which also supports frame bracket 22. Bearing bracket 28 is secured to a horizontal cross frame member 30.

The other end of chute or guide channel 12 is secured to the upper portion of a U-shaped member 32, the lower portion of which is provided with a pair of hubs 34, one on each side of chute 12, although only one arm of member 32 and one hub 34 are shown in Figure 1. Secured in each hub 34 is an end of a rod 36, the other end of which is connected to a lug 20 forming an integral part of bracket 16. To the inner side of each arm of U-shaped member 32 is pivotally mounted a roller (not shown), each roller contacting and rolling on the top edge of a horizontal rod 42, the rods having one end attached to a vertical bracket 44 and the other end provided with a lug 46 (Figure 2) pivotally supported by a horizontal shaft 48. Also carried by member 32 are rollers 40 which contact and roll along the side edges of rods 42. Rods 42 are also connected to each other by means of a pair of tie rods (not shown) which maintain rods 42 parallel to each other and also provide a support for pin guide channel 14 which is secured thereto. To the inner side of each vertical bracket 44 are pivotally attached rollers (not shown), one of which engages with and is adapted to roll on the top edge of one of the rods 36, thereby providing a support for rods 42 and consequently for pin guide channel 14. Each bracket 44 is also provided with a guide roller 39 which engages the opposite side of its respective rod 36 and provides proper guide means for bracket 44 as it moves along rod 36.

The front or pin delivery end of pin distributor D is supported and guided by means of a beveled disc 56 and a guide roller (not shown) both of which engage and run on and along a horizontal track 60 suitably attached to the top of pin spotting and respotting table T. Beveled disc 56 is keyed to a vertical stud 62 rotatably supported in a suitable hub of a bearing member 66 mounted on the front end of distributor D. Stud 62 forms an integral part of a gear (not shown), driven by suitable gearing and clutch mechanism (not shown) to drive beveled disc 56 along track 60 at the proper time for effecting the extension or retraction of parts 12 and 14 of distributor D in the delivery of pins to each of the several pockets 300 mounted on table T. Stud 62 is supported in bearing member 66 by suitable swiveled members such that at all times during the operation of distributor D and even when table T is moving up and down, stud 62 is maintained in a vertical position and beveled disc 56 is properly associated with track 60 along which it moves by reason of the engagement of teeth or notches on beveled disc 56 with complementary teeth or notches formed on the surface of track 60, as shown in Figure 2.

The mechanism for driving beveled member 56 includes a beveled gear (not shown) loosely mounted on shaft 48 coacting with a clutch (not shown) having its driving part attached to shaft 48, the latter being driven by a pulley 142 attached thereto. Pulley 142 is driven by means of a bowling pin conveyor belt 146 from a pulley 148 mounted on shaft 150 supported in suitable bearings in bracket 22. Shaft 150 is driven by a sprocket (not shown) attached thereto from a motor or other suitable source of power. Belt 146 which conveys pins through distributor D is led from pulley 148 to pulley 142 over the bottom of the U-shaped channel formed by guide chutes 12 and 14, over a tension pulley 166 and a guide pulley 168. Tension pulley 166 is freely mounted and floatingly supported by means of a stud 170 and a pair of springs 172 anchored to suitable pins 174 on brackets 44. Guide pulley 168 is rotatably supported on a stud 176, the ends of which are supported by the arms of U-shaped member 32.

Each bowling pin elevated by disc 19 when released therefrom drops into a receiving chute 182 mounted in pin receiving position relative to disc 19 and is oriented and guided thereby onto pin conveyor belt 146, where each pin is delivered butt end forwardly through chutes 12 and 14 for discharge therefrom into one of the pin spotting units 300.

An inclined guide plate 188 suitably attached to front bearing member 66, and two spaced guide members 190 attached to the front end of the side walls of U-shaped guide chute 14, insure the proper discharge of each pin into a unit 300.

As illustrated in Figure 2, pin spotter units 300 on table T are arranged in a substantially triangular pattern conforming to the positions pins occupy on bed A of the alley. Horizontal cam track 60, mounted on table T, which guides and controls the movement of distributor D to and from all spotter units 300, is of a heart-shaped design, Figure 2, and is provided with a number of stops 192 for stopping the movement of the distributor in proper discharge relationship relative to the several pin spotter units 300. Since the starting and stopping of the distributor movement do not constitute a specific part of the invention, further description thereof is omitted in the interest of brevity. It is therefore deemed sufficient to state that after the delivery of a bowling pin to a spotter unit 300, the drive of beveled member 56 is started and the distributor moves to the next empty unit 300 for the delivery of a pin thereto.

As bowling pins are being moved by belt 146 forwardly for discharge from distributor D into pin spotter units 300, each pin engages a trip, such as a disc 120, mounted on a shaft 121 connected to clutch operating means (not shown) which sets into operation the movement of distributor D along cam track 60. As mentioned hereinabove, distributor D, while moving on heart-shaped track 60, through the mechanism described, causes guide chutes 12 and 14 to move together or separate in a manner similar to the operation of the parts of a slide trombone. Pin guide chute 14 telescopes inwardly and outwardly beneath chute 12. The mounting of pulleys 148, 142, 166 and 168 provides an automatic take-up and tensioning means for belt 146 and assures its proper operation regardless of the positions of guide chutes 12 and 14 when belt 146 is effecting the discharge of a pin into a selected spotting unit 300.

Since distributor D, as stated, is designed to deliver pins to the several pinspotter units 300 not only when table T is stationary but also during its ascending and descending movements, there is provided a parallelogram designated generally 282 for maintaining that part of the distributor which supports beveled member 56 at the front or delivery end of the distributor in a horizontal position in order that beveled member 56 and its co-acting roller (not shown) may always be disposed properly relative to track 60. Parallelogram 282 includes a pair of rods 284 pivoted to a horizontal stationary arm 286 which projects from and is mounted on frame bracket 22. The other pair of rods 288 is pivoted to a vertical member 290 which forms an integral part of the front bearing member 66. Both pairs of rods 284 and 288 are pivotally connected to a bell-crank lever 292.

In the illustrated embodiment, table T consists of a generally triangular frame designated 311. This frame is formed of side frame members 312 arranged to form what may be termed the sides of the triangle. The ends of members 312, which converge and form the apex of frame 311, are rigidly secured together, as by welding, by a plate 314. The other ends of members 312 are secured rigidly to brackets 316 provided with spaced antifriction bearings in brackets 318 supporting the ends of a transverse rock shaft 320, the latter forming the base of the triangle of frame 311. Side members 312 and shaft 320 thus form a beam truss providing a light, rigid frame substantially resistant to any twisting or bending forces which might occur in the operation of the machine. Side frame members 312 are also provided with lugs 322 having bearings in which are mounted the ends of transverse rock shafts 324, 326 and 328 which are parallel with rock shaft 320 and spaced apart equal distances one from the other.

As clearly shown in Figure 2, ten spotting units 300 are provided. These units are mounted on table T in triangular arrangement and are operated in such manner as to spot or place ten bowling pins in spotted playing arrangement on alley bed A. Obviously if desired, a different number of units 300 and different arrangement on table T could be used. The arrangement shown conforms with approved rules of play.

Pin spotting units 300, adapted to hold and spot bowling pins numbers 7, 8, 9 and 10 on corresponding spots on alley bed A are carried by rock shaft 320. Shaft 324 carries spotting units 300 adapted to hold and spot number 4, 5 and 6 pins in corresponding spots 4, 5 and 6 on alley bed A. Receptacles 300 for holding and spotting number 2 and 3 pins on corresponding spots 2 and 3 on alley bed A are carried by shaft 326. Shaft 328 supports spotting unit 300 which holds and spots pin number 1 in its conventional spotted position on alley bed A.

As indicated in Figures 1, 2, 9, 10 and 11, adjacent each pin spotting unit 300 is located a guide which assists in the proper disposition of each pin in its respective unit 300. Referring to Figure 2, it will be seen that spotting units, corresponding to pins #7 and #10, are provided with curved guides 171 mounted on lugs 173 on brackets 316. These guides 171 insure that a pin ejected by belt 146 will be directed downwardly into pin spotting units 300 which will hold pins which will be spotted in #7 and #10 positions on alley bed A. Mounted on shafts 324, 326 and 328, are downwardly inclined pin holding members 175 which act both as guides and means for resiliently holding bowling pins in trough members 330 of pin spotting units 300 corresponding to pins which are to be spotted in position numbers 2 to 10 inclusive on alley bed A. Each member 175 is provided with a bent tail portion which presses resiliently against the tapered portion of a pin resting in a trough 330 with which a member 175 is associated. Pinspotting unit 300, which supports and spots pin #1, is provided with a pin guide member 177 having an inclined elongated guide portion 179 extendingt both below and above frame 312 of table T, and provided with end portions 181 suitably attached to brackets 314 secured to frame members 312. Attached to brackets 345 of spotting units 300 corresponding to No. 1 and No. 5 pins, are bridge plates 301 and 299, respectively. These plates bridge the distance from the station points #1 and #5 on cam track 60 and thereby facilitate the passage of pins from distributor D to the spotters indicated.

Since each of the several spotting units 300 is essentially the same in construction, it is deemed necessary to describe only one in detail. Referring to Figures 1, 2, 7, 8, 9 and 10, a typical spotting unit 300 includes an elongated, generally U-shaped trough-like member or receptacle designated 330 which is greater in length than the length of a pin held therein for spotting. Receptacle 330 can be formed of sheet metal, wood, plastic, and stiffened, impregnated, or plastic-coated fabric or combinations of such materials, or the like. Receptacle 330 may be formed in a single piece as illustrated in the above referred to figures, or may be made up of a plurality of parts, into a rigid structure which supports and spots a pin delivered thereinto in accurate playing arrangement on bowling alley bed A. A bowling pin 11 delivered from distributor D into a spotting unit 300 moves or slides along the bottom 332 of trough-like member 330 which is shaped to conform generally with the contour of a pin, and comes to rest thereon between spaced side walls 334 extending upwardly from bottom 332 with the tapered sides of the pin below its belly portion or section of maximum diameter resting upon and supported by a half ring support 336 suitably attached to bottom 332 and to the inner faces of walls 334 as by screws 337. Side walls 334, as shown in Figures 7, 9 and 10, preferably are shaped to act as guides for a pin delivered to a unit 300, and also to provide reinforcing and pin positioning shoulders 338, 340, such that a pin held in a unit 300, see Figures 9 and 10, has its belly portion located between shoulders 340 and its head and neck portion between shoulders 338. Walls 334 also preferably are formed with flanges 342 and a stiffening bead 344 formed integrally with or attached thereto in any suitable manner. In this way, a trough-like member or receptacle 330 may be formed of relatively thin material and have sufficient rigidity to withstand hard usage, and accurate spotting of pins thereby is assured.

As indicated in Figures 1 and 10, the trough-like member or receptacle 330 of each spotting unit 300 is carried by table T with its longitudinal axis inclined with the horizontal when in its normal pin receiving and holding position. When bowling pins are to be spotted on alley A, each spotting unit 300 of the plurality of units carried by table T, is swung clockwise, as viewed in Figure 1, to the position shown by a single unit 300 illustrated in Figure 7. After the spotting units 300 have been swung to the position indicated in full lines in Figure 7 and as table T moves downwardly to place the bases of pins held therein on alley bed, A, further downward movement of table T causes half ring support 336 to move downwardly away from pin 11 in the direction of arrow E, whereupon each pin 11 assumes an upright position on alley bed A, as shown in dotted lines in Figure 7. Spotting units 300 are then swung rearwardly to locate half ring supports 336 clear of all standing pins, and table T rises, leaving a new set of pins on alley bed A.

The upper end of each trough-like member or receptacle 330 is attached to a support bracket 345, as by rivets 346. Bracket 345 is provided with holes 348 through which extend bolts 352 threaded into support bracket 354 of a respotting device 350, one of which devices 350 is associated with each spotter unit 300. When bolts 352 are tightened in bracket 354, brackets 345 and 354 are securely clamped to their respective support shafts 320, 324, 326 and 328 and the sets of spotting units 300 and respotting devices 350 are held thereby clamped on table T.

A key 356 inserted in keyways formed in transverse shafts 320, 324, 326 and 328 and in support brackets 354 of each respotting device 350 insures the proper lateral positioning of each set of spotting units 300 and respotting devices 350 on table T. Holes 348 in bracket 345 are somewhat greater in diameter than the diameter of a bolt 352 which allows a limited amount of adjustment of receptacles 330. This adjustment can be made by selective tightening of bolts 352 to secure the desired final adjusted position of spotting devices 300. It will be evident that by merely unscrewing bolts 352, an entire cell can easily be removed for adjustment or repairs, or replaced by a new cell without disturbing the remainder of the table system.

Since there are ten triangularly arranged respotting devices shown in the embodiment of the invention selected for purposes of illustration, and each device 350 is identical in construction and operation, it is deemed sufficient to describe but one in detail. Referring to Figures 1, 2 and 7 to 16 inclusive, each bracket 354 which supports a respotting device 350, is formed with two spaced arms 355. The outer face of each arm 355 is provided with bosses 353 to which are attached, as by screws 357, a horizontal guide track 358 provided with guide rails 360, on which run rollers 362 rotatably mounted in spaced relation at the top of a gripper jaw cam carriage 364. In the illustrated embodiment, each cam carriage 364 is provided with a pair of spaced guide or cam tracks 366 formed integrally therewith and located along the side vertical edges of carriage 364. A roller 370 pivotally mounted on each upwardly extending arm 372 formed integrally with the transverse pin gripper jaw or clamping bar 374, engages with and runs upon each track 366. As indicated in Figure 8, clamping bar 374 is provided with two arms 372 formed integrally therewith at its ends.

Each respotting device 350 is provided with two opposed, independently movable elongated pin gripping jaws or clamping bars 374. Each arm 372 also mounts rollers 378 adapted to roll on an elongated guide member 380 mounted for parallel movement relative to horizontal guide tracks 358. Each guide member 380 is provided with rails 382 on which rollers 378 run. The axes of the pivots of rollers 370 and 378 lie in the same horizontal line, such that at all times during the movement of rollers 370 and 378 on guide tracks 366 and rails 382, respectively, pin gripping jaws or clamping bars 374 are maintained substantially parallel with the surface of alley bed A. Each pin gripping jaw or clamping bar 374 preferably is provided with a resilient gripping surface 376, such as sponge-rubber, felt, or other suitable resilient material in order to prevent damage to a pin when gripped thereby. In the embodiment illustrated, sponge rubber is used.

As shown in detail in Figures 10, 11 and 12, each cam track 366 on cam carriages 364 is provided with an upper generally straight portion 367 and a lower outwardly diverging straight portion 369 connected by a curved portion 371. The lower end of each cam track 366 is provided with a stop plate 373 preferably formed integrally therewith. Plates 373 prevent rollers 370 from running off rails 366. End plates 381 preferably formed integrally with guide member 380 prevent rollers 378 from runnning off rails 382. Plates 359 formed integrally with tracks 358 prevent rollers 362 from running off rails 360 of tracks 358. The design of cam tracks 366 is such that when gripping jaws 374 are in inoperative position, they are held apart, as shown in Figures 10 and 12. When, however, table T is moved downwardly and standing pins are to be lifted, each jaw 374 of a respotting device 350, which is operated, is moved, as described hereinafter, into gripping engagement with such pins, and held by upper portion 367 of cam tracks 366 in such engagement until a pin held thereby is respotted.

As shown in Figures 8, 9, 10, 11 and 12, each pair of opposed elongated gripping jaws 374 is adapted to grip for lifting and respotting standing bowling pins which are not only in on-spot position, but which have also walked or moved off-spot a substantial distance.

Each respotting device 350 includes a block member designated generally 386 which is pivotally linked to bracket 354 for substantially vertical movement. When gripping jaws 374 of a respotting device 350 are located in spaced or inoperative position, as shown in Figures 10 and 12, block 386 is located in its lower position for a purpose to be described hereinafter. Block member 386 is provided with a pin contacting or clamping portion having a flat under-surface 387 which serves to engage and clamp standing pins firmly upon the playing bed A of a bowling alley when such pins are to be gripped by elongated gripping jaws or clamping members 374 for lifting during the respotting cycle of the associated machine. The width of the flat under-surface of block member 386 is substantially the same as that of the gripping jaws 374, and as indicated in Figures 8 and 10, this width is such as to provide a wide contact clamping area relative to the head of a bowling pin standing on or off-spot on a bowling alley. This arrangement is such that when all ten respotting devices 350 are taken into consideration, bowling pins which have walked or have been moved off spot a substantial distance, will be gripped, lifted and respotted on their off-spot positions. In this manner, the positions of standing pins to be lifted may be laterally or longitudinally offset with respect to the normal or spotted position each pin occupies and each pin will be properly returned to substantially the exact position it occupied prior to being lifted. As described more in detail hereinafter, block member 386 also serves the dual purpose of locking gripping jaws 374 in pin gripping position, and effecting the release of the jaws for the delivery of pins held thereby when respotting the same in on or off-spot position on alley bed A.

When table T is lowered after the rolling of a first ball of a frame, and standing pins remain thereon for lifting and respotting, each such standing pin will be clamped firmly by a pad 388 attached to the flat under-surface 387 of block 386. Pad 388 may be made of any suitable resilient material, such as sponge rubber, felt, or the like. In the illustrated embodiment, it is formed of sponge rubber. This allows each pin gripped by clamping jaws 374 to be held theerby between pads 376 with the top of the pin pressing against pad 388 on block 386 during the lifting operation of each pin and while it is being respotted on alley bed A. Block 386 is provided with an upwardly extending channel shaft projection 390 having spaced arms supporting vertically spaced pivot pins 394 and 396. Pivotally attached to pivot pin 394 is a link 398 having its other end pivotally mounted on pin 400 in arms 355 of bracket 354. Pivotally connected to pivot pin 396 is a link 402 which is parallel with link 398. The other end of link 402 is pivotally connected to a horizontal pin 404 mounted in arms 355, which pin is also connected to spaced arms 406 of a bracket 408 to which is secured track 60 on which runs the displacing mechanism of distributor D.

When table T is lowered by the operation of the table operating mechanism, described hereinafter, the downward movement causes pad 388 on the flat under-surface of block member 386 to engage with the upper ends of any standing pins which remain standing on alley bed A. This engagement stops the descent of each block member 386 engaging a standing pin through downward movement of table T while the latter continues its downward movement. If a bowling pin, or pins, below a respotting device 350 is or are lying on the alley, as shown in Figure 1, the operational position of such respotting device remains unchanged and undisturbed. However, if any pad 388 on under-surface 387 of a block 386 of a respotting device 350 contacts the head of a bowling pin in registration therewith regardless of the fact that it may be on or off-spot during the descent of table T, star cam 420 rotatably mounted on a pin 419 in a vertical flange 422 is engaged by an actuating finger 424 supported on a stud 426 extending from one of the flanges 428 of a channel member 429 attached to bracket 354. Actuating finger 424, as shown in detail in Figures 12–16 inclusive, may consist of a flat spring metal strip, such as steel, supported on pin 426 and held against excess downward movement by means of an abutment 430 formed integrally with one of the flanges 428. In this manner, when upright pressure, due to the presence of a standing pin 11, raises block 386 of the respotting device corresponding to the standing pin to its maximum normal vertical limit, finger 424 comes into engagement with star wheel or cam 420, see Figure 13, and turns the wheel during the relative upward movement of block member 386 and downward movement of bracket 354 such that one of the two notches 432 is engaged by a cam lug 434 attached to or formed integrally with channel member 429. A suitable friction or spring washer 421 on pin 419 holds star wheel or cam 420 against turning unless and until it is engaged by finger 424 or lug 434. As shown in Figure 14, when a notch 432 on star wheel or cam 420 is in engagement with cam lug 434, block 386 is locked against downward vertical movement relative to table T, and more specifically bracket 354. The same locking relationship obtains in all respotting devices 350 which are positioned above standing pins.

As shown in Figures 9, 10, 11 and 12, an elongated guide bar 380 is secured, as by screws 384, in substantially horizontal position to the opposite ends of transverse block members 386. Each guide member 380 is provided with a stop 381 at its ends to prevent rollers 378 from running off the tracks 382 formed thereon. During the downward movement of table T, described above, and the clamping of any standing pins by pads 388 attached to the under surface of blocks 386 as described above, there will be caused an inward movement of each of the opposed grippers 374 on each respotting device 350. The inward movement of each pair of grippers begins as soon as a pin standing in on or off-spot position is engaged by a pad 388 of its respective spotting device. The downward movement of table T, which brings pads 388 in contact with the head ends of standing pins, causes the arrest of block 386 while table T continues its downward movement, resulting in the movement of cam rollers 370 along track portion 369 of cams 366 and a horizontal movement of rollers 378 of each gripper jaw 374 along horizontal tracks 380, thereby causing rollers 370 to travel around curved portion 371 and finally move into vertically positioned portion 367 of cam tracks 366, this taking place at approximately the time notch 432 of cam wheel 420 engages cam lug 434. This operation results therefore not only in the locking of block 386 against downward movement, but also in the positive locking together of each pair of opposed gripping jaws 374 of a respotting device surrounding a standing pin.

In the description given directly above, the operation of the several respotting devices 350 has been stated according to the manipulation of the parts relative to on-spot pins to be gripped, lifted and respotted. In the event that a pin has walked off-spot either laterally or longitudinally, reference is made to Figure 10. If, for example, a pin has moved to the left of the position indicated in Figure 10, it is obvious that the left hand gripper 374 would be the first to engage the side of the neck portion of the pin. Therefore, although there would be continued downward movement of table T and relative upward movement of block 386, movement of left hand gripping jaw 374 would cease, since the pin is held firmly upon alley bed A by pad 388 attached to under-surface 387 of block 386. Notwithstanding this operation, however, the right hand gripper 374 would continue to move towards the right hand side of the neck of pin 11 until it engaged the same and coacted with left-hand gripper 374 to firmly grip the opposite sides of the head of pin 11. This operation is made possible by the construction and operation of carriages 364 on which are mounted cam tracks 366 because when the movement of one gripper jaw is arrested because of its engagement with the side of a pin, carriage 364 shifts on rollers 362 which roll along tracks 360 and re-center gripper jaws 374 with respect to the longitudinal axis of a pin. In this manner, it is evident that whenever a pin is off-spot and is to be lifted, each set of cam carriages 364 of a respotting device 350 automatically re-centers the pair of gripping jaws 374 associated therewith for properly gripping pins for lifting and respotting in their exact off-spot position.

Following the gripping of each standing pin, table T is raised, whereby the several actuated respotting devices lift the on or off-spot pins above alley bed A from which deadwood is removed by any suitable means (not shown). Table T is again lowered for respotting pins lifted thereby into proper respotted position on alley bed A. As soon as the butt ends of each pin engage alley bed A, continued downward movement of table T causes cam lug 434 to be moved out of its engagement with notch 432, and finger 424 presses against one of two tails 436 on cam or star wheel 420, turning it to the position shown in Figure 15. This effects the release of all respotted pins from the sets of gripping jaws 374 of the several respotting devices which were operated. As table T returns upwardly in the direction of the arrow shown in Figure 16, block 386 moves to the position shown in Figure 10, and relative separation between bracket 354 and tracks 358 carried thereby and tracks 380 carried by block 386, effects the spreading apart of the gripping jaws 374 to the positions indicated in Figure 10. The downward movement of block 386 and the upward movement of bracket 354 as the result of upward movement of table T to its dwell position above alley bed A, cause cam lug 434 to engage a side of one of the tails 436 on cam wheel 420. This repositions and readies cam wheel 420, as shown in Figure 16, for the next locking operation of gripping jaws 374 as the result of the upward movement of block 386 when upon the next downward movement of table T, block 386 is engaged by the head end of a standing pin to be lifted and respotted.

Attached to or formed integrally with each bracket 316 is an elongated vertical extension 438, to each of which are pivotally connected upper and lower radius arms 440, 442 respectively, which maintain table T in a substantially horizontal plane at all times, both during its movement to and from alley bed A, and when table T dwells above alley bed A. Extensions 438 preferably are formed from tubular metal stock for strength and also because of their lightness as compared with solid metal. Radius arms 440, 442 are also pivotally connected to supports 444 attached to cross frame member 27. Also pivotally connected to brackets 316 in any suitable manner are stabilizing arms 446, the latter being pivotally joined to brackets attached to cross frame member 27. Stabilizing arms 446 prevent side sway of table T. Springs 447 each having one end attached to extension 438 and the other end attached to a bracket 451 on a support 444, balance the weight of table T and assist in assuring its smooth movement to and from alley bed A. As shown in Figures 1 and 2, radius arms 440 and 442, and arms 446 are provided at their ends with adjustable connections. This arrangement provides means for adjusting the position of table T longitudinally, and/or laterally, and also for leveling it. These adjustments, together with the adjustable supports of spotter units 300, and respotter devices 350, make it possible to obtain great accuracy in spotting and respotting pins on bed A.

Table T is supported above playing bed A of a bowling alley, as indicated in Figure 1, for movement to and from the alley bed for spotting and respotting pins thereon by a frame including spaced side frames 450 mounted on kickbacks 29 of the bowling alley. Each side frame is formed of two uprights 452 and a longitudinal frame member 454. The side frames are connected together by cross members 456, 457. Attached to members 454 are transverse strips 458 on which is mounted motor 460 which is responsible for the movement of table T to and from alley bed A. Motor 460 has operationally associated therewith a conventional gear reduction mechanism enclosed in housing 462, which mechanism through a conventional type one-revolution clutch K1, drives a shaft 604 at a desired rate of speed. The operation of clutch K1 and a cam 606, Figures 5 and 17, secured to shaft 604 will be described in detail hereinafter. Also secured to shaft 604 is a sprocket 608, Figure 5, tracking a chain 610 which drives, at a one to one ratio, a sprocket 612 secured to shaft 464. Attached to each end of shaft 464 is a crank arm 466, each crank arm mounting in its free end a stud shaft 468 to which is pivotally attached an eye 470 having formed integrally therewith a threaded rod portion 472 threadably secured in a connecting rod or table supporting rod 474, which rod at its lower end, see Figure 1, has threadably secured thereto an eye 476 mounted for free movement on the end of shaft 324. When, therefore, motor 460 is set into operation and shaft 464 is rotated, crank arms 466 will cause table T to be lowered and raised with respect to alley bed A for spotting and respotting pins thereon. This mechanism allows the spotting and respotting operations of table T to be effected at the same height above bed A, and permits the use of the simple harmonic drive described.

Referring to Figures 1, 3, 4 and 5, loosely mounted upon and adjacent one end of shaft 464 is a sprocket 478 having formed integrally therewith, or suitably attached thereto, a hub 480 provided with upstanding lugs 482 supporting a pivot pin 484 to which is pivotally connected one end of a link 486, the other end of link 486 being pivotally connected by a pin 488 in a fork formed in lever 490 keyed to a stud shaft 492 mounted in a bearing bracket 494 secured to the underside of one of the longitudinal side frame members 454. Sprocket 478 is tracked by a sprocket chain 496 running on a sprocket 498 fixed to shaft 468. Also attached to shaft 468 is a crank arm 500 provided with a fork supporting a pin 502 on which is pivoted a connecting rod 504, the other end of which is connected to a pin 505 in an arm 506 of a bell crank lever 508 secured to and adjacent one end of shaft 324. This bell crank lever is also provided with an arm 510 to which is connected a link 512 connected in turn to a lever 514 attached to shaft 320. Adjacent the other end of shaft 324 is a bell crank 509, similar in construction to bell crank 508, having an arm 511 to which is connected one end of a link 513, the other end of which is attached to a lever 514 secured to shaft 320. Also attached to shaft 324 are levers 516, to each of which is connected a link 518, these links being connected to levers 520 attached to shaft 326. Attached to shaft 326 are levers 522 having pivotally connected to their free ends links 524, which in turn are connected to levers 526 secured to shaft 328. The link and lever construction just described, provide for the simultaneous movement of each of the ten spotting units 300 from pin holding position indicated in Figures 1, 9 and 10, to pin spotting position indicated in Figure 7.

Springs 528 perform the function of balancing the weight of the several pinspotting units 300 and also assist in returning them to their pin receiving and holding positions after the spotting of a set of pins thereby on alley bed A. Also during the actual spotting operation, springs 528 are instrumental in effecting the release movement of spotting units 300, as shown in dotted lines in Figure 7.

One of the springs 528 has an end attached to pivot pin 505, the other end being attached to a bracket 530 secured to a bracket 316. The other spring 528, shown at the top of Figure 2, has one end secured to a pin 532 carrier by arm 507 of lever 509, the other end of the spring being attached to a bracket 530 also attached to a bracket 316.

When bowling pins are to be spotted on bowling alley bed A, solenoid 540, mounted on a bracket 541 attached to cross frame 457, is energized. This causes the upward movement of the armature of solenoid 540 and rocks bell crank lever 542 to which the armature is attached on shaft 543 mounted in bracket 541 swinging arm 544 on lever 542 to the left, as shown in dotted lines in Figure 3, disengaging cam follower 546 on arm 544 from latching engagement with a cam surface formed on lock arm 548 of lock lever 550, the latter being keyed to shaft 492. An adjustable set screw 549 mounted in bracket 541 is provided to properly position cam follower 546 on lock arm 548. Lock lever 550 is provided with an adjustable pin 552 adapted to engage a lateral projection or extension 554 on cam lever 556 loosely mounted on shaft 492. Cam lever 556 is provided with a cam follower 558 tracking a cam 560 attached to shaft 464.

A spring 562 having one end attached to pin 488 and its other end suitably attached to a bracket 564 attached to a side frame member 454 tends to pull lever 490 to the right, as viewed in Figure 3, whereby whenever solenoid 540 is energized, pin 552 is held pressed against projection 554, and cam follower 558 on lever 556 is held resiliently against the surface of cam 560. It will be seen, therefore, that when solenoid 540 is energized, cam follower 558 is moved into engagement with cam 560 due to the pressure exerted thereon by spring 562. The movement of cam 560 with respect to cam follower 558 and the linkage and leverage described hereinabove, results in sprocket 478 being rotated in the direction of the arrow shown in Figure 3, which results in the rocking of crank arms 500, thereby effecting a turning of shafts 320, 324, 326 and 328, which when table T is located in position II, as indicated in Figure 1, results in the delivery of ten pins in spotted arrangement on alley bed A.

As shown in Figures 1 and 7, when rod 504 is moved downwardly due to the rocking of crank arm 500 and springs 528 move past the dead center of shaft 324, springs 528 effect the rearward movement of each of the trough members or receptacles 330 away from the base of pins being positioned in spotted arrangement on the alley. This final movement does not take place until after the bases of the pins being spotted are actually on the alley bed A and ring portions 336 moved from the full line position, shown in Figure 7, to the dotted line position indicated therein, at which time the gap between the ends of each ring is clear of the pin, the latter resting on the alley so that during the further movement of a trough-like member 330 to dotted position indicated in Figure 7, the pin is freed entirely from the receptacle 330 which supported it and placed it in spotted standing position on alley bed A. Following this action, and due to the continued rotating of shaft 464, and the action of cam 560 on cam follower 558, each trough member 330 of a spotting unit 300 is moved substantially vertically upward and then swung back to the pin supporting and holding position indicated in Figure 1.

On very rare occasions during the operation of the machine, it may happen that a bowling pin will "walk" or be moved so far off-spot that it cannot be gripped by gripping jaws 374 and will interfere with the downward travel of table T to position II. In order to prevent damage to the machine, such as breakage of parts, mechanism is provided for stopping the machine.

Referring to Figures 1 and 6, each rod 474 is provided with two telescoping parts 474, 475. Part 475 carries a bracket 477 in which is fixedly mounted an adjustable rod 479 having its free end extending upwardly through an opening in a plate 481 having a hub attached to rod 474. A spring 483, encircling rod 474 and rod portion 475, bears against bracket 477 and plate 481, normally tending to urge them apart. If for any reason, such as described, downward movement of table T to position II is prevented, due to the telescopic arrangement shown in detail in Figure 6, spring 483 will be compressed and rod 479 will engage switch 485 in a normally closed circuit through the motor 460, breaking the circuit and stopping the machine, thereby preventing further downward movement of table T and preventing damage to the machine and breakage of parts.

Table T is mounted for movement to and from alley bed A after each first ball of a frame is rolled in order to test for the presence or absence of standing pins. If all pins are knocked down by the first ball and a "strike" is made, table T moves up and then down and spots a new set of pins on the alley. If pins remain standing after the first ball of a frame is rolled, and the game of ten pins or king pins is being played, after lifting and respotting such standing pins in on or off-spot position on alley bed A, table T remains in its dwell position above alley bed A until after the second or last ball of the frame is rolled, and fallen and standing unwanted pins are removed by suitable means (not shown) and ejected into pit P. Table T then is moved downwardly to spot a new set of pins on alley bed A, after which it moves upwardly to its dwell position.

When each of the spotting units 300 is moved to its spotting position, each respotting device 350 is also swung in a clockwise direction, as shown in Figure 7. This operation causes rollers 362 to roll by gravity downwardly along tracks 358 and block 386 moves toward shaft 328 thereby moving carriages 364 and gripper jaws 374 out of centered relationship. On the return movement of spotting units 300 to pin receiving and supporting position, see Figures 1 and 10, rollers 362 move back along tracks 358 because of the movement due to gravity of block member 386 and the coaction of rollers 370 with cam tracks 366 and rollers 378 with rails 382 of guide members 380 carried by block member 386. Rollers 370 then engage stops 381 at the ends of tracks 380, carriages 364 are recentered, and gripper jaws are returned to open positions ready to grip pins to be lifted and respotted.

Assuming that each of the ten pin holding receptacles 330 of pin spotting units 300 holds a bowling pin, and table T is in its uppermost position, or position I, indicated by dotted lines in Figure 1, and also that there are no pins on the alley A, a new set of pins may be placed on the alley by the manual operation of push button 600. The closing of contacts 600b energizes relay 602 which closes contacts 602b and starts motor 460, which through a conventional type one-revolution clutch K1, drives shaft 604. The closing of contacts 600b also momentarily energizes solenoid 614 which results in the inward movement of armature 616 and a rocking of lever 615 which activates clutch K1 to connect shaft 604 with motor 460. The closing of contacts 600a energizes a relay 618 thereby closing contacts 618b, which energizes solenoid 540 and disengages cam follower 546 from lock arm 548 in the manner previously described. As shaft 604 rotates, cam 606, secured thereto, effects the closing of contacts 620 and causes relays 602 and 618 to be held in by their respective contacts 602A and 618a. Continued rotation of shafts 604 and 464 causes table T to descent to position II, Figure 1, by means previously described, place a set of ten pins on the alley, and then return to its starting position, at which time, clutch K1 disengages shaft 604 from motor 460 and arrests the rotation of shaft 604. At this time cam 606 opens its contacts 620, relays 602 and 618 fall out, motor 460 stops, and solenoid 540 is de-energized.

If, after a bowling ball has been rolled, a strike is made, the deadwood is removed by suitable conventional means, not shown, and a new set of pins placed upon the alley in the manner described above.

When a strike is not made, push button 622 is depressed. The closing of its contacts 622a energizes relay 602 thereby closing contact 602b which makes a circuit through motor 460 thereby starting motor 460. The closing of switch contacts 622a also energizes the coil of solenoid 614 which actuates clutch K1 as previously described. The closing of contacts 622b energizes the relay 624. The closing of the latter's contacts 624b starts timing motor 626. The rotation of a cam 628, secured to shaft 630 of said timing motor, closes its contacts 632, which holds in relay 624 through its contacts 624a. The table descends, picks up standing pins in a manner previously described, returns to its starting position and stops when cam 606 opens its contacts 620. The table T dwells in this position for a period which is predetermined by the relative speeds of shafts 604 and 630. During this period, a sweep (not shown) removes any deadwood. This also takes place when pins remain standing after the second ball of a frame has been rolled. A cam 634, secured to shaft 630, then closes contacts 636 momentarily, which reengages clutch K1 as previously described. The table descends and respots the pins picked up in a manner heretofore described. The table then ascends and stops when cam 606 opens its contacts 620. Continued rotation of cam 628 opens its contacts 632, relay 624 falls out, and timing motor 626 stops.

As previously mentioned, a safety switch 485 is provided. Referring to Figure 17, it will be seen that if switch 485 were to be opened, in the manner previously described, motor 460, or motor 460 and 626, would stop and prevent further downward movement of table T.

The above described invention may be varied in construction within the scope of the claims, for the particular device, selected to illustrate the invention, is but one of many possible concrete embodiments of the same. It is not therefore to be restricted to the precise details of the structure shown and described.

What we claim is:

1. Bowling pin handling apparatus comprising a table, means mounting said table for movement to and from the pin supporting bed of a bowling alley, a plurality of individually substantially vertically movable pin-engaging and clamping heads mounted on said table, a set of opposed pin gripper jaws carried by said table in coacting relationship with each of said heads, means mounting said gripper jaws for substantially horizontal linear movement into and out of gripping engagement with the handle end of a standing pin, a pair of spaced separate gripper jaw actuating cam tracks mounted adjacent the opposite edges of said clamping heads, means on each of said gripper jaws operatively associating a gripper jaw with one of said cam tracks, said heads normally holding said jaws of said sets of jaws in spaced open relationship, whereby the handle end of standing pins may pass therebetween and engage the underside of said head, means for lowering said table to engage the undersurface of said heads with standing pins, and means actuated by the relative movements of said heads and said table for alternately maintaining and releasing said jaws in gripping engagement with the opposite sides of standing pins.

2. Bowling pin handling apparatus comprising a pin lifting table, a plurality of pin gripping devices mounted on said table, each of said devices including a substantially vertically movable clamping head, a support for said head, means mounting said head on said support for substantially vertical movement, an elongated track mounted at each end of said clamping head, spaced elongated tracks mounted on said support and substantially parallel with said tracks carried by said head, a pair of laterally spaced gripper actuating carriages, a plurality of rollers on said carriages running on said tracks on said support, a pair of spaced cam tracks on each of said carriages, said cam tracks having two spaced substantially vertical sections and two downwardly inclined outwardly diverging sections, a plurality of rollers on said gripper devices, means mounting a number of said last-named rollers to run in said sections and another number of said last-named rollers to run in said first named track, said gripper device being operative in response to the downward movement of said table, and the engagement of a clamping head with a standing on or off-spot pin for moving said rollers in said gripper devices upwardly in said cam tracks on said carriages to actuate said gripping device to grip on and off-spot bowling pins.

3. The invention defined in claim 2 including an upstanding flange on each of said pin clamping heads, a rotary locking member on each of said flanges, a locking finger on each of said supports for said heads, said finger being operative in response to its engagement with said rotary locking member for rotating said member to lock said gripper devices in pin gripping positions, said finger also being operative in response to the next downward movement of said table for respotting pins lifted thereby for turning said locking member to release said grippers whereby said pins are respotted, and said grippers are restored to open pin receiving position, and means for relocating said rotary locking member for engagement by said locking finger.

4. Bowling pin handling apparatus for use in a bowling pin spotting machine, comprising a frame, a vertically movable table mounted in said frame, a plurality of individually movable pin contacting and clamping heads mounted on said table, each of said heads having a substantially flat, wide contact clamping area relative to the head of a pin to be clamped in standing on or off-spot position on a bowling alley, a set of opposed pin gripping jaws carried by said table in operative association with each of said heads, means normally maintaining said jaws in open pin receiving position with said head located therebetween, said means including a plurality of cams, and cam followers on said jaws engaging said cams, an operating track carried on each end of said heads, cam followers on said jaws engaging and rolling on said tracks, and mechanism for lowering said table to cause said heads to engage and clamp any pins standing on or off-spot on said alley and position said sets of grippers for movement into gripping engagement with the opposite sides of said standing pins, said cams and tracks being operative in response to the downward movement of said table relative to said heads clamping said standing pins on said alley to move said grippers inwardly to grip said standing pins.

5. The invention defined in claim 4 including laterally spaced carriages mounting said cams, rollers on said carriages, substantially horizontal guide means on said table supporting said rollers, whereby when a standing pin is off-spot on said alley, upon engagement of one of said jaws of a set of jaws with said standing pin said carriage shifts to center said jaws for gripping said off-spot pin.

6. The invention defined in claim 4 including a locking member on each of said heads, and a member on said table coacting therewith for locking said gripper jaws in closed gripping relationship, said members being operative in response to the downward movement of said table in respotting gripped pins for automatically unlocking said jaws, whereby upon the next upward movement of said table said cams move said jaws to open position.

7. Bowling pin handling mechanism for use in a bowling pin spotting machine comprising a pin lifting table, a frame supporting said table, mechanism for moving said table to and from the pin supporting bed of a bowling alley, a plurality of pin handling devices mounted on said table, each of said devices including a pin clamping head and means supporting said head for individual substantially vertically movement by and with respect to said table, opposed pin grippers operatively associated with each of said heads, means mounting each of said grippers for substantially horizontal and linear movement into and out of engagement with a side of the handle end of a standing on or offspot pin, means on said heads movably supporting said gripper mounting means whereby said grippers are moved inwardly by relative movement between said table and head to engage a standing or offspot pin, said gripper mounting means being laterally shiftable on said heads for centering said grippers relative to offspot pins to be gripped and lifted.

8. A respotting device for a bowling pin spotting machine comprising a support, spaced elongated guide channels mounted on said support, a pair of laterally spaced carriages, rollers on said carriages engaging with and movable in said guide channels, longitudinally spaced cam guide channels mounted on said carriages, a pin head engaging clamp plate mounted on said support for substantially vertical movement, elongated guide channels mounted on said clamp plate in substantially parallel relationship with said first-named guide channels, a pair of opposed elongated grippers, each of said grippers having a roller engaging said last-named guide channel, and one of said cam guide channels, said cam guide channels being operative in response to downward movement of said table and arrested downward movement of said plate due to engagement of said plate with the head of a standing pin to move said grippers into gripping position.

9. A respotting device as defined in claim 8 including means operative in response to the vertical upward movement of said plate for locking said grippers in gripping relationship.

10. The device defined in claim 9 including a latch actuated by said plate for locking said grippers in pin gripping relationship, and means actuated in response to pressure applied to the base of a bowling pin when said pin held by said grippers is respotted on a bowling alley for unlocking said locking means to effect the release of a pin from said grippers.

11. The invention defined in claim 10 including a frame movable to and from the playing bed of a bowling alley, means mounting said support on said frame, means for moving said frame towards said alley to bring the undersurface of said clamp plate in clamping engagement with the head of a standing pin to hold said pin on said bed against movement whereby said clamp plate moves upwardly relative to the downward movement of said frame, said movement of said plate moving said grippers towards the opposite sides of the handle end of a standing pin, said pin when standing off-spot being operative to shift said carriages on said first-named guide channels and center said grippers relative to said clamped standing off-spot pin, and means for securing said grippers in gripping engagement with said pin.

12. The invention defined in claim 11 including means for lowering said frame to respot said pin gripped by said grippers on said alley bed, and means operative in response to the re-engagement of said pin with said alley bed for effecting the release of said pin from said grippers.

13. Bowling pin handling apparatus comprising a pin lifting table, a plurality of pin gripping devices mounted on said table, each of said devices including a substantially vertically movable clamping head, a support for said head, means mounting said head on said support for substantially vertical movement, an elongated track mounted at each end of said clamping head, spaced elongated tracks mounted on said support and substantially parallel with said tracks carried by said head, a pair of laterally spaced gripper jaw actuating carriages, a plurality of support elements on said carriages, means mounting said support elements to run on said tracks on said support, a pair of spaced cam tracks on said carriage, said cam tracks having two longitudinally spaced substantially vertical sections and two downwardly inclined outwardly diverging sections, first supports on said jaws, means mounting said first supports for movement in sections, said second supports on said jaws, means mounting said second supports for movement in said named track, said gripper jaws being operative in response to the downward movement of said table, and the engagement of a clamping head with a standing on or off-spot pin for moving said first and second supports on said jaws in their associated tracks to grip on and off-spot bowling pins.

References Cited in the file of this patent

UNITED STATES PATENTS

| | | |
|---|---|---|
| 2,221,697 | Ball | Nov. 12, 1940 |
| 2,514,457 | Schmidt | July 11, 1950 |
| 2,530,385 | Frye | Nov. 21, 1950 |
| 2,611,612 | Schmidt | Sept. 23, 1952 |
| 2,616,693 | Montooth | Nov. 4, 1952 |
| 2,621,930 | Mead | Dec. 16, 1952 |
| 2,621,961 | Whipple et al. | Dec. 16, 1952 |
| 2,634,979 | Schon | Apr. 14, 1953 |
| 2,672,341 | Flint | Mar. 16, 1954 |
| 2,688,486 | Hedenskoog | Sept. 7, 1954 |
| 2,692,139 | Dumas | Oct. 19, 1954 |
| 2,705,145 | Fluke et al. | Mar. 29, 1955 |
| 2,736,554 | Fluke et al. | Feb. 28, 1956 |
| 2,740,631 | Montooth et al. | Apr. 3, 1956 |